(12) United States Patent
Irie

(10) Patent No.: US 11,981,786 B2
(45) Date of Patent: May 14, 2024

(54) SPONGE-FORMING SILICONE RUBBER COMPOSITION AND SILICONE RUBBER SPONGE

(71) Applicant: DOW TORAY CO., LTD., Tokyo (JP)

(72) Inventor: Masakazu Irie, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 925 days.

(21) Appl. No.: 16/965,349

(22) PCT Filed: Jan. 18, 2019

(86) PCT No.: PCT/JP2019/001478
§ 371 (c)(1),
(2) Date: Jul. 28, 2020

(87) PCT Pub. No.: WO2019/150991
PCT Pub. Date: Aug. 8, 2019

(65) Prior Publication Data
US 2021/0122893 A1    Apr. 29, 2021

(30) Foreign Application Priority Data

Feb. 1, 2018 (JP) ................................. 2018-016829

(51) Int. Cl.
| | |
|---|---|
| C08G 77/12 | (2006.01) |
| C08G 77/20 | (2006.01) |
| C08J 3/07 | (2006.01) |
| C08J 9/00 | (2006.01) |
| C08J 9/28 | (2006.01) |
| C08K 3/34 | (2006.01) |
| C08K 3/36 | (2006.01) |
| C08K 5/5415 | (2006.01) |
| C08K 5/56 | (2006.01) |
| C08L 83/04 | (2006.01) |

(52) U.S. Cl.
CPC .............. *C08J 9/0061* (2013.01); *C08J 3/07* (2013.01); *C08J 9/0066* (2013.01); *C08J 9/28* (2013.01); *C08K 3/346* (2013.01); *C08K 3/36* (2013.01); *C08L 83/04* (2013.01)

(58) Field of Classification Search
None
See application file for complete search history.

(56) References Cited

U.S. PATENT DOCUMENTS

| | | |
|---|---|---|
| 5,332,762 A | 7/1994 | Maschberger et al. |
| 5,504,174 A * | 4/1996 | Onishi ................. C09D 183/04 |
| | | 525/478 |
| 6,147,157 A | 11/2000 | Inokuchi et al. |
| 2007/0123628 A1 | 5/2007 | Shirasaki et al. |
| 2011/0021649 A1 | 1/2011 | Sakuma et al. |

FOREIGN PATENT DOCUMENTS

| | | | |
|---|---|---|---|
| CN | 101983989 A | 3/2011 | |
| CN | 104031391 A | 9/2014 | |
| JP | H06207038 A | 7/1994 | |
| JP | H1149955 A | 2/1999 | |
| JP | 2002114860 A | 4/2002 | |
| JP | 2004070159 A | 3/2004 | |
| JP | 2004346248 A | 12/2004 | |
| JP | 2008214625 A | 9/2008 | |
| JP | 2013189496 A | 9/2013 | |
| KR | 1020160082093 A | 7/2016 | |
| WO | WO-2016132690 A1 * | 8/2016 | ............ C08J 9/0004 |
| WO | 2017110565 A1 | 6/2017 | |

OTHER PUBLICATIONS

English translation of International Search Report for PCT/JP2019/001478 dated Apr. 23, 2019, 2 pages.
Machine assisted English translation of JP2002114860A obtained from https://patents.google.com/patent on Jul. 27, 2020, 17 pages.
Machine assisted English translation of JP2004070159A obtained from https://patents.google.com/patent on Jul. 27, 2020, 7 pages.
Machine assisted English translation of JP2013189496A obtained from https://patents.google.com/patent on Jul. 27, 2020, 14 pages.
Machine assisted English translation of KR1020160082093A obtained from https://patents.google.com/patent on Jul. 27, 2020, 18 pages.
Machine assisted English translation of WO2017110565A1 obtained from https://patents.google.com/patent on Jul. 27, 2020, 10 pages.
Machine assisted English translation of CN101983989A obtained from https://patents.google.com/patent on Mar. 8, 2022, 11 pages.
Machine assisted English translation of CN104031391A obtained from https://patents.google.com/patent on Mar. 8, 2022, 10 pages.

* cited by examiner

*Primary Examiner* — Melissa A Rioja
(74) *Attorney, Agent, or Firm* — Warner Norcross + Judd LLP

(57) ABSTRACT

A sponge-forming silicone rubber composition is disclosed. The sponge-forming silicone rubber composition comprises: (A) an organopolysiloxane having at least two alkenyl groups per molecule; (B) an organopolysiloxane having at least two silicon atom-bonded hydrogen atoms per molecule; (C) water; (D) a thickener; (E) a surfactant; (F) a silane compound having silicon atom-bonded alkoxy groups, or a partially hydrolyzed condensate thereof; and (G) a hydrosilylation reaction catalyst. The sponge-forming silicone rubber composition forms a silicone rubber sponge. In general, the silicone rubber sponge has excellent water absorption and water retentivity.

10 Claims, No Drawings

SPONGE-FORMING SILICONE RUBBER COMPOSITION AND SILICONE RUBBER SPONGE

CROSS-REFERENCE TO RELATED APPLICATIONS

This application is the National Stage of International Appl. No. PCT/JP2019/001478 filed on 18 Jan. 2019, which claims priority to and all advantages of Japanese Appl. No. 2018-016829 filed on 1 Feb. 2018, the content of which is hereby incorporated by reference.

TECHNICAL FIELD

The present invention relates to a sponge-forming silicone rubber composition, along with a silicone rubber sponge obtained by crosslinking the composition and then removing water.

BACKGROUND ART

Silicone rubber sponges have excellent heat resistance and weather resistance, in addition to being light weight, and are therefore used for automobile parts, as well as rolls and belts of imaging apparatuses such as copiers or printers, along with various seal parts such as packings, gaskets, or O-rings.

Known silicone rubber compositions for forming such a silicone rubber sponge include: a sponge-forming silicone rubber composition comprising: a diorganopolysiloxane having at least two silicon atom-bonded alkenyl groups per molecule, an organopolysiloxane having at least two silicon atom-bonded hydrogen atoms per molecule, smectite clay-containing water, a nonionic surfactant, and a hydrosilylation reaction catalyst (see Patent Document 1); and a sponge-forming silicone rubber composition comprising: a diorganopolysiloxane blocked at both molecular chain terminals with alkenyl groups and having no alkenyl groups at a molecular side chain, a diorganopolysiloxane having at least two alkenyl groups at a molecular side chain, an organopolysiloxane having at least two silicon atom-bonded hydrogen atoms per molecule, a mixture of water and smectite clay, a nonionic surfactant, a hydrosilylation reaction catalyst, and a curing retarder (see Patent Document 2). In addition, upon curing such a silicone rubber composition in a uniform emulsification state, water can be removed from the obtained silicone rubber to form the silicone rubber sponge.

Unfortunately, the silicone rubber sponge obtained by such a sponge-forming silicone rubber composition problematically has poor water absorption and water retentivity, thereby limiting the applications thereof.

PRIOR ART DOCUMENTS

Patent Documents

Patent Document 1: Japanese Unexamined Patent Application Publication No. 2004-346248
Patent Document 2: Japanese Unexamined Patent Application Publication No. JP 2008-214625

SUMMARY OF THE INVENTION

Problems to be Solved by the Invention

An object of the present invention is to provide a silicone rubber sponge, which forms a sponge-forming silicone rubber composition, having excellent water absorption and water retentivity. Moreover, another object of the present invention is to provide a silicone rubber sponge having excellent water absorption and water retentivity, wherein the volume thereof tends not to expand even upon absorbing water.

Means for Solving the Problems

The sponge-forming silicone rubber composition according to the present invention comprises:
(A) 100 parts by mass of an organopolysiloxane having at least two alkenyl groups per molecule;
(B) an organopolysiloxane having at least two silicon atom-bonded hydrogen atoms per molecule, in an amount such that the silicon atom-bonded hydrogen atoms in this component are 0.4 to 20 mols with respect to one mol of the alkenyl groups in component (A);
(C) 20 to 1000 parts by mass of water;
(D) 0.01 to 15 parts by mass of a thickener with respect to 100 parts by mass of component (C);
(E) 0.1 to 15 mass parts of a surfactant;
(F) 0.1 to 20 parts by mass of a silane compound having silicon atom-bonded alkoxy groups or a partially hydrolyzed condensate thereof; and
(G) a hydrosilylation reaction catalyst in a sufficient amount to crosslink the present composition.

Component (A) is preferably an organopolysiloxane consisting of:
(A-1) 10 to 90 mass % of a diorganopolysiloxane having on an average two alkenyl groups at molecular chain terminals and having no alkenyl group at a molecular side chain; and
(A-2) 10 to 90 mass % of a diorganopolysiloxane having at least two alkenyl groups at a molecular side chain.

Component (D) is preferably at least one thickener selected from a group consisting of: an inorganic thickener, cellulose fibers, an aqueous polymer, a water-absorbing polymer, a hydrophilic composite consisting of the inorganic thickener and the aqueous polymer, and a hydrophilic composite consisting of the inorganic thickener and the water-absorbing polymer, with the inorganic thickener being preferably smectite clay.

Component (E) is preferably a surfactant consisting of:
(E-1) a nonionic surfactant having an HLB value of 3 or more; and
(E-2) a nonionic surfactant having an HLB value of less than 3,
wherein a mass ratio of component (E-1) to component (E-2) is at least 1.

Component (F) is preferably methyltrimethoxysilane, 3-methacryloxypropyltrimethoxysilane, 3-glycidoxypropyltrimethoxysilane, methylsilicate, or ethylsilicate.

The present composition preferably further comprises:
(H) 0.001 to 5 parts by mass of a hydrosilylation reaction inhibitor with respect to 100 parts by mass of component (A).

Moreover, the present composition preferably comprises:
(I) 40 parts by mass or less of reinforcing silica fine powder with respect to 100 parts by mass of component (A).

The silicone rubber sponge according to the present invention is obtained by crosslinking the abovementioned sponge-forming silicone rubber composition and then removing water from silicone rubber.

Effects of the Invention

The sponge-forming silicone rubber composition according to the present invention can form a silicone rubber sponge having good water absorption and water retentivity with good moldability. Moreover, the silicone rubber sponge according to the present invention has good water absorption and water retentivity, wherein the volume thereof tends not to expand even upon absorbing water.

Mode for Carrying Out the Invention

First, the sponge forming silicone rubber composition according to the present invention will be described in detail.

Component (A) is an organopolysiloxane serving as a main component of the present composition and having at least two alkenyl groups per molecule. Exemplary alkenyl groups in component (A) include alkenyl groups having 2 to 12 carbon atoms, such as vinyl groups, allyl groups, isopropenyl groups, butenyl groups, isobutenyl groups, pentenyl groups, hexenyl groups, heptenyl groups, octenyl groups, pentenyl groups, nonenyl groups, decenyl groups, and dodecenyl groups, with vinyl groups preferable. While the bonding position of this alkenyl group is not limited, the alkenyl group may be bonded to silicon atoms at a terminal of a molecular chain and/or silicon atoms in a molecular chain. Moreover, exemplary silicon atom-bonded organic groups other than alkenyl groups in component (A) include: alkyl groups having 1 to 12 carbon atoms, such as methyl groups, ethyl groups, propyl groups, butyl groups, pentyl groups, hexyl groups, heptyl groups, octyl groups, nonyl groups, decyl groups, undecyl groups, and dodecyl groups; cycloalkyl groups having 5 to 12 carbon atoms, such as cyclopentyl groups, cyclohexyl groups, cycloheptyl groups, and cyclooctyl groups; aryl groups having 6 to 12 carbon atoms, such as phenyl groups, tolyl groups, xylyl groups, and naphthyl groups; aralkyl groups having 7 to 12 carbon atoms, such as benzyl groups and phenethyl groups; and groups obtained by substituting some or all hydrogen atoms of these groups with halogen atoms such as fluorine and chlorine, with methyl groups and phenyl groups preferable.

A molecular structure of component (A) is not limited. Examples thereof include a linear structure, a partially branched linear structure, a branched structure, a cyclic structure, and a resinous structure, with a linear structure or a partially branched linear structure preferable. Component (A) may be a mixture of two or more organopolysiloxanes having these molecular structures.

Exemplary such component (A) include a dimethylpolysiloxane blocked at both molecular chain terminals with dimethylvinylsiloxy groups, a dimethylpolysiloxane blocked at both molecular chain terminals with diphenylvinylsiloxy groups, a dimethylsiloxane-methylphenylsiloxane copolymer blocked at both molecular chain terminals with dimethylvinylsiloxy groups, a dimethylsiloxane-diphenylsiloxane copolymer blocked at both molecular chain terminals with dimethylvinylsiloxy groups, a dimethylsiloxane-methylphenylsiloxane copolymer blocked at both molecular chain terminals with diphenylvinylsiloxy groups, a dimethylsiloxane-methylvinylsiloxane copolymer blocked at both molecular chain terminals with dimethylvinylsiloxy groups, a dimethylsiloxane-methylphenylsiloxane-methylvinylsiloxane copolymer blocked at both molecular chain terminals with dimethylvinylsiloxy groups, a dimethylsiloxane-diphenylsiloxane-methylvinylsiloxane copolymer blocked at both molecular chain terminals with dimethylvinylsiloxy groups, a methylvinylpolysiloxane blocked at both molecular chain terminals with trimethylsiloxy groups, a methylvinylsiloxane-methylphenylsiloxane copolymer blocked at both molecular chain terminals with trimethylsiloxy groups, a methylvinylsiloxane-diphenylsiloxane copolymer blocked at both molecular chain terminals with trimethylsiloxy groups, a dimethylsiloxane-methylvinylsiloxane copolymer blocked at both molecular chain terminals with trimethylsiloxy groups, and mixtures of two or more of these organopolysiloxanes.

Moreover, while not limited thereto, a viscosity of component (A) at 25° C. is preferably 50 mPa·s or more or 100 mPa·s or more, and 100,000 mPa·s or less. This is because, if the viscosity of component (A) is the abovementioned lower limit or more and the abovementioned upper limit or less, an emulsion of the obtained silicone rubber composition will be stable, and a silicone rubber sponge having uniform air bubbles tends to be obtained. Note that the viscosity of this organopolysiloxane at 25° C. can be measured, for example, using a B type viscometer in accordance with JIS K7117-1.

Such component (A) is preferably a mixture consisting of:
(A-1) a diorganopolysiloxane having on an average two alkenyl groups at molecular chain terminals and having no alkenyl group at a molecular side chain; and
(A-2) a diorganopolysiloxane having at least two alkenyl groups at a molecular side chain.

Component (A-1) is a diorganopolysiloxane having on an average two alkenyl groups at molecular chain terminals and having no alkenyl group at a molecular side chain, with specific examples thereof including a dimethylpolysiloxane blocked with dimethylvinylsiloxy groups, a dimethylsiloxane-methylphenylsiloxane copolymer blocked with dimethylvinylsiloxy groups, and a branched dimethylpolysiloxane in which the main chain consists of repeated dimethylsiloxane units, the main chain is partially branched, and terminals of a molecular chain are blocked with dimethylvinylsiloxy groups, with a diorganopolysiloxane having a substantially linear main chain preferable.

Component (A-2) is a diorganopolysiloxane having at least two alkenyl groups at a molecular side chain, with specific examples thereof including a methylvinylpolysiloxane blocked with trimethylsiloxy groups, a dimethylsiloxane-methylvinylsiloxane copolymer blocked with trimethylsiloxy groups, a dimethylsiloxane-methylvinylsiloxane-methylphenylsiloxane copolymer blocked with trimethylsiloxy groups, and a branched dimethylsiloxane-methylvinylsiloxane copolymer in which the main chain consists of repeated dimethylsiloxane units and methylvinylsiloxane units, the main chain is partially branched, and terminals of a molecular chain are blocked with trimethylsiloxy groups, with a diorganopolysiloxane having a substantially linear main chain preferable.

While a blending ratio of component (A-1) to component (A-2) is not limited thereto, component (A) preferably consists of 10 to 90 mass % of component (A-1) and 10 to 90 mass % of component (A-2) in order to improve the shrinkage rate of the obtained silicone rubber sponge.

Component (B) is a crosslinking agent for the present composition and is an organopolysiloxane having at least two silicon atom-bonded hydrogen atoms per molecule. The silicon atom-bonded hydrogen atoms in component (B) may be bonded to silicon atoms at a terminal of a molecular chain and/or silicon atoms in a molecular chain. A molecular structure of component (B) is not limited. Examples thereof include a linear structure, a partially branched linear structure, a branched structure, a cyclic structure, and a dendritic structure, with a linear structure or a partially branched linear structure preferable. Component (B) is preferably a linear organopolysiloxane.

Exemplary such components (B) include a dimethylpolysiloxane blocked at both molecular chain terminals with dimethylhydrogensiloxy groups, a dimethylsiloxane-methylphenylsiloxane copolymer blocked at both molecular chain terminals with dimethylhydrogensiloxy groups, a dimethylsiloxane-methylhydrogensiloxane copolymer blocked at both molecular chain terminals with dimethylhydrogensiloxy groups, a dimethylsiloxane-methylhydrogensiloxane copolymer blocked at both molecular chain terminals with trimethylsiloxy groups, an organopolysiloxane consisting of $H(CH_3)_2SiO_{1/2}$ units and $SiO_{4/2}$ units, and an organopolysiloxane consisting of $H(CH_3)_2SiO_{1/2}$ units, $(CH_3)_3SiO_{1/2}$ units, and $SiO_{4/2}$ units.

Moreover, while not limited thereto, a kinematic viscosity of component (B) at 25° C. is preferably 1 mm²/s or more and 1,000 mm²/s or less. Note that the kinematic viscosity of this organopolysiloxane at 25° C. can be measured using an Ubbelohde type viscometer in accordance with JIS Z8803.

A content of component (B) is an amount such that silicon atom-bonded hydrogen atoms in the present component are within a range of 0.4 to 20 mols with respect to 1 mol of alkenyl groups in component (A), wherein the lower limit thereof is preferably an amount of 1.0 mol, an amount of 1.5 mols, or an amount of 1.8 mols, while the upper limit thereof is an amount of 10 mols, or an amount of 5 mols. This is because, by keeping the content of component (B) within the abovementioned range, the permanent compression set of the obtained silicone rubber sponge is improved.

Water for component (C) is a component which is removed from silicone rubber after crosslinking the present composition, so as to make this silicone rubber porous. A content of component (C) is within the range of 20 to 1000 parts by mass with respect to 100 parts by mass of component (A), wherein the lower limit thereof is preferably 20 parts by mass, 30 parts by mass, 40 parts by mass, or 50 parts by mass, while the upper limit thereof is 800 parts by mass, 650 parts by mass, or 500 parts by mass. This is because, if the content of component (C) is at the lower limit of the abovementioned range or more, the obtained silicone rubber sponge tends to have porous and uniform air bubbles; in contrast, if the content is at the upper limit of the abovementioned range or less, a silicone rubber sponge tends to be obtained.

While not limited thereto, the water used in component (C) can be tap water, well water, ion exchanged water, distilled water, etc. In particular, because the dispersion in component (A) is stabilized, component (C) is preferably ion exchanged water.

The thickener for component (D) is a component for thickening water for component (C), facilitating the dispersion of component (C) in component (A), and stabilizing the dispersion state of component (C) in component (A) to obtain a uniform and porous silicone rubber. Such component (D) is preferably at least one selected from the group consisting of: an inorganic thickener, cellulose fibers, an aqueous polymer, a water-absorbing polymer, a hydrophilic composite consisting of the inorganic thickener and the aqueous polymer, and a hydrophilic composite consisting of the inorganic thickener and the water-absorbing polymer.

The inorganic thickener for component (D) is a natural or synthetic inorganic thickener, with examples thereof including natural or synthetic smectite clays such as bentonite, in which clay minerals such as bentonite (montmorillonite), hectorite, saponite, sauconite, beidellite, and nontronite serve as the main component. Such smectite clay, for example, is available as SUMECTON (registered trademark of Kunimine Industries Co., Ltd.) and LUCENTITE (registered trademark of Co-op Chemical Co., Ltd.) for hydrothermal synthetic products; KUNIPIA (registered trademark of Kunimine Industries Co., Ltd.), BENGEL (registered trademark of HOJUN Co., Ltd.), BENTONE (registered trademark of Elementis plc), and VEEGUM (registered trademark of Vanderbilt) for natural refined products. Because a rise in viscosity upon the dispersion in water is significant and the content of component (E) can be reduced, this inorganic thickener is preferably bentonite (montmorillonite), hectorite, or saponite. In order to maintain the heat resistance of the silicone rubber sponge, the pH of these smectite clays is preferably within the pH range of 5.0 to 9.0. Moreover, a hydrophilic composite consisting of such smectite clays and an aqueous polymer or water-absorbing polymer such as polyacrylic acid may be used.

Cellulose fibers for component (D) are formed into nanofibers by subjecting natural or synthetic cellulose fibers to chemical treatment and physical treatment. In terms of dispersibility, thickening properties, etc., a number average fiber diameter of such cellulose fibers is preferably within a range of 2 to 150 nm, within a range of 2 to 100 nm, or within a range of 2 to 10 nm. This is because, if the number average fiber diameter is within the abovementioned range, the cellulose fibers tend not to be precipitated, when dispersed in water, and can be thickened while maintaining flowability.

The cellulose fibers for component (D) are available as water dispersions of cellulose nanofibers produced by DKS Co. Ltd. (trade name: Rheocrysta C-2SP).

Exemplary aqueous polymers for component (D) include alginic acid, sodium alginate, sodium salt of carboxylate, sodium salt of carboxy cellulose, methyl cellulose, cellulose ether, hydroxyethyl cellulose, modified starch, polyvinyl alcohol, polyacrylate, and sodium salt of polyacrylate.

Moreover, exemplary water-absorbing polymers for component (D) include a polypolyacrylate crosslinked body and polyoxyalkylene based water-absorbing resin.

A content of component (D) is within a range of 0.01 to 15 parts by mass with respect to 100 parts by mass of component (C), wherein the lower limit thereof is preferably 0.05 parts by mass or 0.1 parts by mass, while the upper limit thereof is preferably 10 parts by mass or 5 parts by mass. This is because, if the content of component (D) is at the lower limit of the abovementioned range or more, component (C) can be sufficiently thickened; in contrast, if the content is at the upper limit of the abovementioned range or less, emulsification of the silicone rubber composition can be stabilized.

Component (E) is a surfactant for uniformly emulsifying water in the silicone rubber composition to obtain a uniform and porous silicone rubber. Exemplary such component (E) include anionic, cationic, amphoteric ionic, and nonionic surfactants, with specific examples thereof including: nonionic surfactants such as glycerin fatty acid ester, polyglycerin fatty acid ester, sorbitan fatty acid ester, sucrose fatty acid ester, polyethylene glycol fatty acid ester, polypropylene glycol fatty acid ester, polyoxyethylene glycerin fatty acid ester, polyoxyethylene sorbitan fatty acid ester, polyoxyethylene-polyoxypropylene block copolymer, polyoxyethylene alkylether, polyoxyethylene alkylphenylether, and polyoxyethylene fatty acid amide; nonionic surfactants consisting of polyorganosiloxanes such as a polysiloxane-polyoxyethylene graft copolymer; cationic surfactants such as aliphatic amine salt, quaternary ammonium salt, and alkylpyridinium salt; anionic surfactants such as higher fatty acid salt, higher alcohol sulfuric ester salt, alkylbenzene sulfonate, alkylnaphthalene sulfonate, and polyethylene glycol sulfuric ester salt; and amphoteric ionic surfactants such as carboxy betaine type or glycine type. In particular, nonionic surfactants are preferable because a hydrosilylation reaction of the present composition has little effect on crosslinking.

These surfactants may be used alone or two or more types thereof may be used in combination. An HLB value of an emulsifier (note that it is a weight average HLB value thereof if two or more surfactants are used in combination) is preferably 1 or more, 10 or less, 1.5 or more, and less than 6, or 3.5 or more, and less than 6.

As component (E), a surfactant is preferably used which consists of: (E-1) a nonionic surfactant having an HLB value of 3 or more; and (E-2) a nonionic surfactant having an HLB value of less than 3. A mass ratio of component (E-1) to component (E-2) is at least 1, preferably at least 5, at least 8, at least 10, or at least 15. Moreover, the mass ratio of component (E-1) to component (E-2) is preferably at most 100 or less, more preferably at most 80, at most 70, at most 60, or at most 50. This is because, if the mass ratio is the abovementioned lower limit or more, a low density sponge having a uniform, fine, and continuous air bubble structure can be formed; in contrast, if the mass ratio is the abovementioned upper limit or less, components (C) and (D) can be stably dispersed in component (A), such that a silicone rubber sponge having a uniform, fine, and continuous air bubble structure can be formed.

A content of component (E) is within a range of 0.1 to 15 parts by mass with respect to 100 parts by mass of component (A), wherein the lower limit thereof is preferably 0.2 parts by mass, while the upper limit thereof is preferably 10 parts by mass. This is because, if the content of component (E) is at the lower limit of the abovementioned range or more, component (C) can be uniformly dispersed in component (A); in contrast, if the content is at the lower limit of the abovementioned range or less, it does not influence the mechanical properties and electric properties of the obtained silicone rubber sponge.

Component (F) is a silane compound having silicon atom-bonded alkoxy groups, or a partially hydrolyzed condensate thereof, in order to impart water absorption and water retentivity to the silicone rubber sponge obtained by curing the present composition. Exemplary components (F) include methyltrimethoxysilane, methyltriethoxysilane, dimethyldimethoxysilane, vinyltrimethoxysilane, allyltrimethoxysilane, 3-methacryloxypropyltrimethoxysilane, 3-acryloxypropyltrimethoxysilane, 3-glycidoxypropyltrimethoxysilane, 3-glycidoxypropylmethyldimethoxysilane, 2-(3,4-epoxycyclohexyl)ethyltrimethoxysilane, methylsilicate, and ethylsilicate, with methyltrimethoxysilane, 3-methacryloxypropyltrimethoxysilane, 3-glycidoxypropyltrimethoxysilane, methylsilicate, or ethylsilicate preferable.

A content of component (F) is within a range of 0.1 to 20 parts by mass, preferably within a range of 1 to 10 parts by mass, with respect to 100 mass parts of component (A). This is because, if the content of component (F) is at the lower limit of the abovementioned range or more, a silicone rubber sponge having excellent water absorption and water retentivity can be formed; in contrast, if the content is at the upper limit of the abovementioned range or less, a silicone rubber sponge having a uniform, fine, and continuous air bubble structure can be formed.

Component (G) is a hydrosilylation reaction catalyst for promoting the hydrosilylation reaction of the present composition. Examples thereof include platinum based catalysts, palladium based catalysts, and rhodium based catalysts, with platinum based catalysts preferable. Exemplary such components (G) include: platinum chloride; alcohol modified platinum chloride; coordination compounds of platinum chloride with olefines, and vinylsiloxane or acetylenic compounds; coordination compounds of platinum with olefines, and vinylsiloxane or acetylenic compounds; platinum based catalysts such as powdery platinum based catalysts obtained by dispersing these in thermoplastic resin; and furthermore, palladium based catalysts such as tetrakis(triphenylphosphine)palladium; and rhodium based catalysts such as chlorotris (triphenylphosphine)rhodium.

A content of component (G) is a sufficient amount to crosslink the present composition, specifically preferably an amount in which the catalytic metal in component (G), in mass units, is within a range of 0.01 to 500 ppm or within a range of 0.1 to 100 ppm, with respect to the total amount of components (A) and (B).

The present composition may further comprise (H) a hydrosilylation reaction inhibitor in order to adjust the crosslinking speed and operation pot life of the present composition. Exemplary component (H) include: alkyne alcohols such as 3-methyl-1-butyn-3-ol, 3,5-dimethyl-1-hexyn-3-ol, 3-phenyl-1-butyn-3-ol, and 1-ethynyl-1-cyclohexanol; enyne compounds such as 3-methyl-3-penten-1-yne and 3,5-dimethyl-3-hexen-1-yne; alkenyl group-containing low molecular weight siloxanes such as tetramethyltetravinylcyclotetrasiloxane, tetramethyltetrahexenylcyclotetrasiloxane, a dimethylsiloxane-methylvinylsiloxane copolymer oligomer blocked at both molecular chain terminals with dimethylhydroxysiloxy groups, and a methylvinylsiloxane oligomer blocked at both molecular chain terminals with dimethylhydroxysiloxy groups; and alkyne-containing silanes such as methyl-tris(1,1-dimethyl-2-butyneoxy)silane and vinyl-tris(1,1-dimethyl-2-butyneoxy)silane.

While a content of component (H) is not limited, and is appropriately selected in accordance with methods for using and molding the present composition, the content is preferably within a range of 0.001 parts by mass to 5 parts by mass with respect to 100 parts by mass of component (A) because the crosslinking speed and operation pot life of the present composition can be sufficiently adjusted.

The present composition may further comprise (I) reinforcing silica fine powder in order to improve the mechanical properties of the obtained silicone rubber sponge. Exemplary component (I) include fumed silica and precipitated silica. Moreover, these silica fine powders may be surface treated with a chain polyorganosiloxane, a cyclic polyorganosiloxane, hexamethyldisilazane, various organosilanes, or the like. Moreover, component (I) preferably has a specific surface area of 50 to 350 $m^2/g$ or 80 to 250 $m^2/g$ using the BET adsorption method.

A content of component (I) is preferably 40 parts by mass or less, more preferably 25 parts by mass or less, with respect to 100 mass parts of component (A). This is because, if the content of component (I) is at the upper limit of the abovementioned range or less, mechanical strength can be improved without impairing the uniformity and fineness of air bubbles of the obtained silicone rubber sponge.

The present composition may comprise a conductive filler in order to impart electric conductivity to the obtained silicone rubber sponge. Exemplary conductive fillers include: carbon based conductive agents such as carbon black, carbon fibers, carbon nanotubes, and graphite; metal powders such as gold, silver, and nickel; conductive zinc oxide; conductive titanium oxide; conductive aluminum oxide; conductive fillers obtained by carrying out conductive coating on filler surfaces such as metal plating on various filler surfaces; and mixtures of two or more thereof. Because good conductivity can be obtained by the addition of a small amount, this conductive filler is preferably carbon black, with specific examples thereof including acetylene black, conductive furnace black (CF), superconductive furnace black (SCF), extraconductive furnace black (XCF), conductive channel black (CC), and furnace black or channel black heat treated at a high temperature of approximately 1500° C. While not limited thereto, a content of this conductive filler is preferably 100 parts by mass or less or 70 parts by mass or less with respect to 100 parts by mass of component (A) because a good sponge can be obtained.

As long as the object of the present invention is not impaired, the present composition may comprise, as any other components: reinforcing fillers other than silica such as fumed titanium oxide; non-reinforcing fillers such as quartz powder, diatomaceous earth, aluminosilicate, iron oxide, zinc oxide, calcium carbonate, aluminum oxide, cerium oxide, mica, clay, and zinc carbonate; fillers obtained by surface treating these fillers with organic silicon compounds such as organosilane and polyorganosiloxane; and, in addition, an antiseptic agent, rust preventing agent, pigment, heat resistant agent, flame retardant, internal mold release agent, plasticizer, acid acceptor, or nonfunctional silicone oil.

The present composition can be prepared by mixing components (A) to (G), along with any other components, if necessary. In order to prepare the present composition, known kneading means such as homomixers, paddle mixers, homodispers, colloid mills, and vacuum mixing stirring mixers can be used. Exemplary methods for preparing the present composition prepare include: a method involving adding components (A), (B), (C), (D), (E), and (F) into a mixer, stirring and mixing for a predetermined time, and, immediately prior to use thereof, mixing component (G), for example, using a mixing apparatus such as a static mixer or a dynamic mixer; a method involving adding components (A), (C), (D), (E), (F), and (G) into a mixer, stirring and mixing them for a predetermined time, and, immediately prior to use thereof, mixing component (B), for example, using a mixing apparatus such as a static mixer or a dynamic mixer; and a method involving adding components (A), (C), (D), (E), and (F) into a mixer, stirring and mixing for a predetermined time, and, immediately prior to use thereof, mixing components (B) and (G), for example, using a mixing apparatus such as a static mixer or a dynamic mixer.

Moreover, when preparing the present composition, in terms of the storage stability thereof, the present composition is stored as a three pack type sponge-forming silicone rubber composition consisting of:
  liquid A: a composition containing components (A), (C), (D), (E), (F), and (G), but not containing component (B);
  liquid B: a composition containing components (A), (C), (D), (E), and (F), but not containing components (B) or (G); and
  liquid C: a composition containing component (B), but not containing components (C), (D), (E), (F), or (G).
Alternatively, the present composition is stored as a three pack type sponge-forming silicone rubber composition consisting of:
  liquid A': a composition containing components (A), (G), and (F), and as required component (E), but not containing components (B), (C), or (D);
  liquid B': a composition containing component (B) and as required components (E) and (F), but not containing components (C), (D), or (G); and
  liquid C': a composition containing components (C) and (D), and as required component (E), but not containing components (A), (B), (F), or (G). Immediately before molding, a three pack is, for example, preferably mixed using a mixing apparatus such as a static mixer or a dynamic mixer. Moreover, the present composition is stored as a two pack type sponge forming silicone rubber composition consisting of:
  liquid A": a composition containing components (A), (C), (D), (E), (F), and (G), but not containing component (B); and
  liquid B": a composition containing component (B), but not containing components (C), (D), (E), (F), or (G). Immediately before molding, a two pack is, for example, preferably mixed using a mixing apparatus such as a static mixer or a dynamic mixer.

The silicone rubber sponge can be formed from the present composition by various methods. Specifically, the present composition can be uniformly emulsified, then injected into a cavity of a molding die, maintained at a temperature of less than 100° C., preferably 50 to 90° C. under pressure to mold a silicone rubber molded body in a water-containing state, removed from the die, and secondarily vulcanized at 120 to 250° C., more preferably 120 to 180° C., to remove water from the silicone rubber molded body in a water-containing state so as to obtain a silicone rubber sponge having fine and uniform air bubbles. Moreover, the present composition is ejected from a nozzle in a rod shape, for example, introduced into hot water at 80 to 100° C. and cured, after which a cured product can be dried with hot air to make a string shaped silicone rubber sponge. Moreover, the present composition can be coated on a peelable substrate such as a resin film, for example, heated and cured to 50 to 120° C., and dried with hot air to remove water or heated and cured while removing water, with the peelable substrate then removed so as to form a silicone rubber sponge sheet. Alternatively, the present composition can be coated on a synthetic fiber fabric and a glass cloth, for example, heated and cured to 50 to 120° C., and dried with hot air to remove water or heated and cured while removing water so as to form a silicone rubber sponge coating cloth.

Next, the silicone rubber sponge according to the present invention will be described in detail.

The silicone rubber sponge according to the present invention is obtained by crosslinking the abovementioned sponge-forming silicone rubber composition via a hydrosilylation reaction, then removing water from the obtained silicone rubber or removing water while crosslinking this composition by the hydrosilylation reaction. Because this silicone rubber sponge has excellent water absorption and water retentivity and the volume thereof tends not to expand even if it absorbs water, that is, it tends not to swell, it is suitable as a cooling sheet material and a water absorbing pad material. Moreover, this silicone rubber sponge is suitable as water, an aqueous solution of inorganic salt, an aqueous solution of an organic compound, or an absorbent material or holding material of a hydrophilic organic compound.

While not limited thereto, a thickness of this silicone rubber sponge layer is preferably within a range of 0.05 to 80 mm or within a range of 0.1 to 50 mm because its rubber elasticity is effectively utilized.

EXAMPLES

The sponge-forming silicone rubber composition and silicone rubber sponge according to the present invention will be described in further detail by way of more examples. Note that the viscosity in the examples is the value at 25° C.

<Density>

The density of the silicone rubber sponge was measured in accordance with JIS K 6268.

<Hardness (Asker C)>

The hardness of the silicone rubber sponge was measured in accordance with a test method using the type C hardness tester stipulated in JIS K 7312. Note that for the measurement, two silicone rubber sponge test pieces having a thickness of 6 mm were laminated and used.

<Tensile Strength, Elongation>

The tensile strength and elongation according to the silicone rubber sponge were measured in accordance with JIS K 6251.

<Air Bubble State>

The cross section of the silicone rubber sponge test pieces was visually observed and evaluated as:
uniform when the air bubble state was uniform over the entire cross section; and
nonuniform when excessive air bubbles were partially recognized.

<Average Air Bubble Diameter>

The central part obtained by cutting the silicone rubber sponge test pieces with a razor blade was observed with a scanning electron microscope to measure the air bubble diameter.

<Water Absorption and Water Retentivity>

A strip shaped test piece having a width of 15 mm and a length of 100 mm was created from a molded sheet having a thickness of 2 mm, then left to stand at 25° C. for 24 hours in a 300 cc container having 100 cc water such that 20 mm of the lower side of the strip shaped test piece was in contact with water. The test piece was removed after 24 hours, after which the height to which water was sucked up was measured and used as an index of water absorption. When the entire test piece absorbed water, it was 100 mm, so 100 mm was the maximum value.

Moreover, the increase in the mass of the test piece after absorbing water to the initial mass of the test piece was expressed as a percentage in accordance with the following equation to obtain the value used as an index of water retentivity.

$$\text{Water retentivity}(\%) = \frac{\text{Mass(g) after water supply} - \text{initial mass(g)}}{\text{Initial mass(g)}} \times 100 \quad \text{[Equation 1]}$$

Examples 1 to 5 and Comparative Examples 1 and 2

In the below-mentioned silica masterbatch, components (A), (C), (D), (E), and (F), and other components were added into a homomixer (produced by Tokushu Kika Kogyo Co., Ltd.) at the blending ratio of Table 1, then uniformly mixed at 25° C. Subsequently, component (B) was blended in the obtained mixture and degassed to prepare a sponge-forming silicone rubber composition. Note that in the silicone rubber composition, the molar ratio of silicon atom-bonded hydrogen atoms in the component corresponding to component (B) to the total of 1 mol of vinyl groups in the component corresponding to component (A) was 3.

The obtained sponge-forming silicone rubber composition was crosslinked and cured under conditions of 90° C./10 minutes using a compression molding machine to make a silicone rubber test piece in a water-containing state. Subsequently, this test piece was left to stand in an open system at 150° C. for four hours to remove water in the test piece and obtain a silicone rubber sponge test piece. Using this silicone rubber sponge test piece, the density, hardness, tensile strength, elongation, air bubble state, air bubble diameter, water absorption, and water retentivity were measured, the results of which are indicated in Table 1.

As the silica masterbatch, a silica masterbatch was used which was obtained by adding, into a Ross mixer, 100 parts by mass of a dimethylpolysiloxane blocked at both molecular chain terminals with dimethylvinylsiloxy groups and having a viscosity of 40 Pa·s (content of vinyl groups=0.09 mass %), 50 parts by mass of fumed silica having a BET specific surface area of 225 m²/g, 10 parts by mass of hexamethyldisilazane, 2 parts by mass of water, and 0.2 parts by mass of a dimethylsiloxane-methylvinylsiloxane copolymer blocked at both molecular chain terminals with dimethylhydroxysiloxy groups and having a viscosity of 20 mPa·s (content of vinyl groups=approximately 10.9 mass %), uniformly mixing them at room temperature, and then heating at 200° C. for two hours under reduced pressure.

The following components were used as component (A-1).

Component (a-1): a dimethylpolysiloxane blocked at both molecular chain terminals with dimethylvinylsiloxy groups and having a viscosity of 9 Pa·s (content of vinyl groups: 0.14 mass %)

Component (a-2): a dimethylpolysiloxane blocked at both molecular chain terminals with dimethylvinylsiloxy groups and having a viscosity of 2 Pa·s (content of vinyl groups: 0.23 mass %)

The following components were used as component (A-2).

Component (a-3): a dimethylmethylvinylpolysiloxane blocked at both molecular chain terminals with trimethylsiloxy groups and having a viscosity of 40 Pa·s (content of vinyl groups=0.50 mass %).

Component (a-4): a dimethylsiloxane-methylvinylsiloxane copolymer blocked at both molecular chain terminals with dimethylvinylsiloxy groups and having a viscosity of 350 mPa·s (content of vinyl groups: approximately 1.17 mass %).

Component (a-5): a dimethylsiloxane-methylvinylsiloxane copolymer blocked at both molecular chain terminals with trimethylsiloxy groups and having a viscosity of 40 Pa·s (content of vinyl groups: 0.13 mass %).

As component (B), a dimethylsiloxane-methylhydrogensiloxane copolymer blocked at both molecular chain terminals with trimethylsiloxy groups and having a viscosity of 63 mPa·s (content of silicon atom-bonded hydrogen atoms: approximately 0.70 mass %) was used.

Ion exchanged water was used as component (C), smectite clay (organic polymer composite refined bentonite produced by HOJUN Co., Ltd.; pH of 6.5) was used as component (D), and 0.85 parts by mass of smectite clay and 99.15 parts by mass of ion exchanged water were added into a homomixer, then uniformly mixed and prepared at room temperature to prepare a mixture of water and smectite clay.

The following components were used as component (E).

Component (e-1): a nonionic surfactant of HLB of 4.3 (sorbitan fatty acid ester, RHEODOL SP-010V produced by Kao Corporation).

Component (e-2): a nonionic surfactant of HLB of 1.8 (sorbitan fatty acid ester, RHEODOL SP-030V produced by Kao Corporation).

The following components were used as component (F).

Component (f-1): 3-methacryloxypropyltrimethoxysilane
Component (f-2): 3-glycidoxypropyltrimethoxysilane
Component (f-3): methylsilicate (SILICATE 40 produced by Tama Kogyo K.K.)

As component (G), a 1,3-divinyltetramethyldisiloxane solution of a 1,3-divinyltetramethyldisiloxane complex of platinum (content of platinum metal: approximately 4000 ppm) was used.

The following components were used as component (H).

Component (h-1): a dimethylsiloxane-methylvinylsiloxane copolymer blocked at both molecular chain terminals with dimethylhydroxysiloxy groups and having a viscosity of 20 mPa·s (content of vinyl groups=approximately 10.9 mass %).

Component (h-2): a mixture of 2 parts by mass of 1-ethynyl-1-cyclohexanol and 98 parts by mass of a dimethylpolysiloxane blocked at both molecular chain terminals with dimethylvinylsiloxy groups and having a viscosity of 10 Pa·s (content of vinyl groups: 0.13 mass %).

As a pigment masterbatch, a mixture of 40 parts by mass of red iron oxide (trade name: Bayferrox, produced by Bayer) and 60 parts by mass of a dimethylpolysiloxane blocked at both molecular chain terminals with dimethylvinylsiloxy groups and having a viscosity of 10 Pa·s (content of vinyl groups: 0.13 mass %) was used.

What is claimed is:

1. A sponge-forming silicone rubber composition comprising:
   (A) 100 parts by mass of an organopolysiloxane having at least two alkenyl groups per molecule;
   (B) an organopolysiloxane having at least two silicon atom-bonded hydrogen atoms per molecule, in an amount such that 0.4 to 20 moles silicon-atom bonded hydrogen atoms in component (B) are provided with respect to one mole of alkenyl groups in component (A);
   (C) 20 to 1000 parts by mass of water;
   (D) 0.01 to 15 parts by mass of a thickener with respect to 100 parts by mass of component (C);
   (E) 0.1 to 15 mass parts of a surfactant;
   (F) 0.1 to 20 parts by mass of a silane compound having silicon atom-bonded alkoxy groups, or a partially hydrolyzed condensate thereof; and
   (G) a hydrosilylation reaction catalyst in a sufficient amount to crosslink the composition.

2. The sponge-forming silicone rubber composition according to claim 1, wherein component (A) consists of:
   (A-1) 10 to 90 mass % of a diorganopolysiloxane having on average two alkenyl groups at molecular chain terminals and having no alkenyl group at a molecular side chain; and
   (A-2) 10 to 90 mass % of a diorganopolysiloxane having at least two alkenyl groups at a molecular side chain; provided the total of components (A-1) and (A-2) is 100 mass % of component (A).

3. The sponge-forming silicone rubber composition according to claim 1, wherein component (D) is at least one thickener selected from a group consisting of: an inorganic thickener, cellulose fibers, an aqueous polymer, a water-absorbing polymer, a hydrophilic composite consisting of

TABLE 1

| | | | Example | | | | | Comparative Example | |
|---|---|---|---|---|---|---|---|---|---|
| | | | Example 1 | Example 2 | Example 3 | Example 4 | Example 5 | Comparative Example 1 | Comparative Example 2 |
| Silica masterbatch | | | 19.3 | 19.3 | 19.3 | 54.6 | 34.7 | 19.3 | 54.8 |
| Component (A) | Component (A-1) | Component (a-1) | 32.7 | 32.7 | 32.7 | 25.3 | 10.0 | 32.6 | 25.4 |
| | | Component (a-2) | — | — | — | 10.9 | — | — | — |
| | Component (A-2) | Component (a-3) | — | — | — | — | 19.2 | — | — |
| | | Component (a-4) | 31.5 | 31.5 | 31.5 | 29.8 | 49.3 | 31.4 | 29.7 |
| | | Component (a-5) | 23.3 | 23.3 | 23.3 | — | — | 23.3 | — |
| Component (B) | | | 7.2 | 7.2 | 7.2 | 6.3 | 10.9 | 7.5 | 6.5 |
| Component (C) | | | 247 | 247 | 247 | 422 | 411 | 248 | 410 |
| Component (D) | | | 2.1 | 2.1 | 2.1 | 3.6 | 3.5 | 2.1 | 3.5 |
| Component (E) | Component (e-1) | | 3.6 | 6.0 | 3.6 | 4.2 | 5.2 | 3.7 | 4.2 |
| | Component (e-2) | | 0.3 | 0.3 | 0.3 | 0.1 | 0.3 | 0.3 | 0.1 |
| Component (F) | Component (f-1) | | 4.2 | — | — | — | — | — | — |
| | Component (f-2) | | — | 4.2 | — | — | — | — | — |
| | Component (f-3) | | — | — | 4.2 | 4.7 | 4.6 | — | — |
| Component (G) | | | 0.4 | 0.4 | 0.4 | 0.4 | 0.3 | 0.4 | 0.3 |
| Component (H) | Component (h-1) | | 0.5 | 0.5 | 0.5 | — | 0.5 | 0.5 | — |
| | Component (h-2) | | — | — | — | 0.35 | — | — | 0.40 |
| Pigment masterbatch | | | 7.5 | 7.5 | 7.5 | 5.5 | 6.7 | 7.5 | 5.5 |
| Density (g/m$^3$) | | | 0.39 | 0.39 | 0.42 | 0.29 | 0.34 | 0.40 | 0.29 |
| Hardness (Asker C) | | | 18 | 19 | 19 | 19 | 24 | 18 | 19 |
| Tensile strength (MPa) | | | 0.24 | 0.26 | 0.17 | 0.16 | 0.11 | 0.25 | 0.30 |
| Elongation (%) | | | 78 | 70 | 90 | 52 | 30 | 79 | 50 |
| Air bubble state | | | Uniform | Uniform | Uniform | Uniform | Uniform | Uniform | Uniform |
| Air bubble diameter (μm) | | | 3-5 | 3-5 | 3-5 | 3-5 | 3-5 | 3-5 | 3-5 |
| Water absorption (mm) | | | 100 | 100 | 97 | 100 | 65 | 33 | 20 |
| Water retention (%) | | | 169 | 169 | 140 | 258 | 131 | 52 | 5 |

INDUSTRIAL APPLICABILITY

The sponge-forming silicone rubber composition according to the present invention can form a silicone rubber sponge having excellent water absorption and water retentivity, making it suitable for the application of forming a silicone rubber sponge which is used under the harsh environments of a heat insulating material, sound absorbing material, cushion, packing, gasket, pad, etc.

the inorganic thickener and an aqueous polymer, and a hydrophilic composite consisting of the inorganic thickener and a water-absorbing polymer.

4. The sponge-forming silicone rubber composition according to claim 3, wherein component (D) comprises or is smectite clay.

5. The sponge-forming silicone rubber composition according to claim 1, wherein component (E) consists of:
- (E-1) a nonionic surfactant having an HLB value of 3 or more; and
- (E-2) a nonionic surfactant having an HLB value of less than 3;
- wherein a mass ratio of component (E-1) to component (E-2) is at least 1.

6. The sponge-forming silicone rubber composition according to claim 1, wherein component (F) comprises or is methyltrimethoxysilane, 3-methacryloxypropyltrimethoxysilane, 3-glycidoxypropyltrimethoxysilane, methylsilicate, or ethylsilicate.

7. The sponge-forming silicone rubber composition according to claim 1, further comprising: (H) 0.001 to 5 parts by mass of a hydrosilylation reaction inhibitor with respect to 100 parts by mass of component (A).

8. The sponge-forming silicone rubber composition according to claim 7, further comprising: (I) greater than 0 to 40 parts by mass of reinforcing silica fine powder with respect to 100 parts by mass of component (A).

9. A silicone rubber sponge obtained by crosslinking the sponge-forming silicone rubber composition according to claim 1 and then removing water from the silicone rubber.

10. The sponge-forming silicone rubber composition according to claim 1, further comprising: (I) greater than 0 to 40 parts by mass of reinforcing silica fine powder with respect to 100 parts by mass of component (A).

* * * * *